R. L. BEATTIE.
PIPE COUPLING.
APPLICATION FILED SEPT. 5, 1912.
1,082,993.
Patented Dec. 30, 1913.
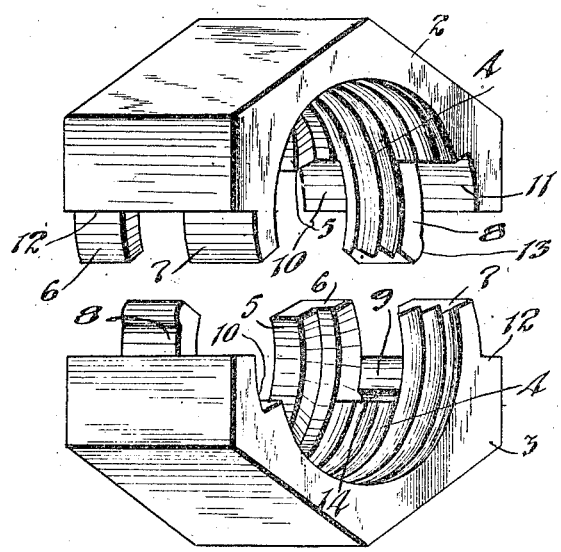
Fig. 1
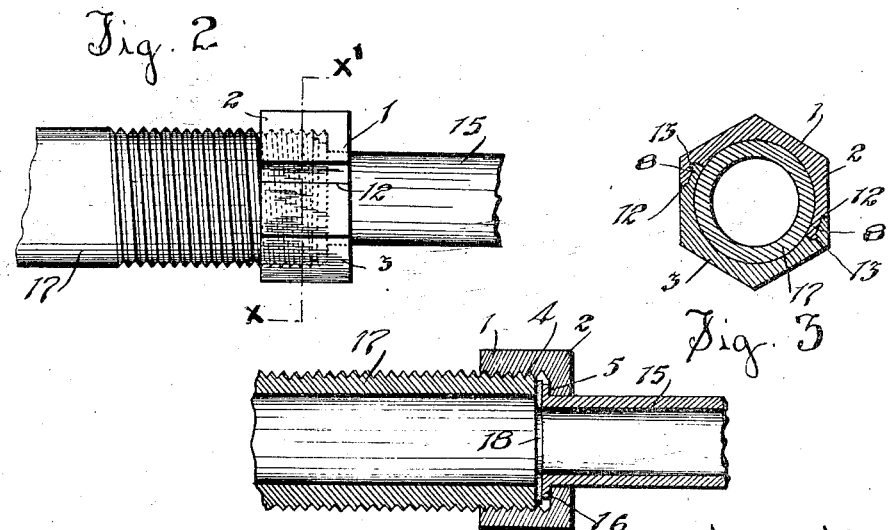
Fig. 2
Fig. 3
Fig. 4
Witnesses
J. S. Roxburgh
R. Foster
Inventor
R. L. Beattie
By
Fred. B. Fetherstonhaugh
Attx

UNITED STATES PATENT OFFICE.

RICHARD LANDGRIGE BEATTIE, OF WINNIPEG, MANITOBA, CANADA.

PIPE-COUPLING.

1,082,993.  Specification of Letters Patent.  Patented Dec. 30, 1913.

Application filed September 5, 1912. Serial No. 718,618.

*To all whom it may concern:*

Be it known that I, RICHARD LANDGRIGE BEATTIE, of the city of Winnipeg, in the Province of Manitoba, Canada, have invented certain new and useful Improvements in Pipe-Couplings, of which the following is the specification.

The invention relates to a coupling for connecting pipes, and the object of the invention is to provide an effective, durable and inexpensive coupling which can be readily removed from the pipes, and it consists essentially of two sections supplied each with extending tongues and recesses adapted to be fitted together to form a complete coupling, the parts being arranged and constructed as hereinafter more particularly described, reference being had to the accompanying drawing in which—

Figure 1 represents an enlarged perspective view of the coupling with the sections pulled apart. Fig. 2 is a side elevation of the coupling supplied on the pipes. Fig. 3 is a vertical sectional view through the coupling, the section being taken at the point indicated by the line X X', Fig. 2. Fig. 4 is a vertical longitudinal sectional view through the pipe and couplings.

In the drawing like characters of reference indicate corresponding parts in each figure.

Considerable difficulty is oftentimes experienced in removing the ordinary coupling from the usual flanged end of a pipe in instances where the flanged pipe cannot be easily disconnected. The pipe has either to be removed and the coupling slipped off the end or the coupling has to be cut. My coupling is constructed to avoid this difficulty as it can be taken off immediately it is unscrewed as will shortly be apparent.

1 represents the coupling which comprises two complementary sections 2 and 3 adapted to be fitted together when in use. Each section is interiorly threaded at 4 and fitted with a shoulder 5 and is supplied at one side with a pair of extending tongues 6 and 7 and at the other side with a single centrally located tongue 8. A recess or pocket 9 is reserved in each section between the tongues 6 and 7 and further recesses or pockets are formed at 10 and 11 at each side of the central tongue 8. The tongues are not the full thickness of the coupler so that a shoulder appears at 12, which shoulders fit together when the sections are connected. The tongues 8 are each supplied with a small cross rib 13 at their extremities, which ribs are designed to spring into cross grooves 14 formed at the bases of the recesses 9. From the above description it will be seen that when the two sections are brought together they form a coupling of ordinary appearance with an internal thread and a continuous shoulder all around.

To understand the value of this coupling I will now describe it as applied on pipes. 15 represents a pipe having an out turned flange 16, and 17 a further exteriorly threaded pipe which it is required to connect to the pipe 15, it being noticed that the external diameter of the pipe 15 is considerably smaller than that of the pipe 17. A washer 18 is inserted between the ends of the pipes to make a tight joint and the split coupling is closed around the pipe 15 with the tongues in the pockets. It is then advanced toward the pipe 17 on to which it is screwed, the shoulders of each section drawing the pipe 15 tightly against the end of the pipe 17 as the coupling is screwed up. This will make as effective a joint as a solid coupling as it will be seen it cannot pull apart for the reason that when it is threaded on to the end of the pipe the tongues are locked by the pipe as the distance between the tips of the tongues 6 and 7 to the tip of the tongue 8 of each section is more than half the circumference of the pipe 17 on which the section is screwed. Assuming that for any reason whatever it is desired to remove the coupling and that the pipe 15 is a permanent structure or cannot be easily undone one has little difficulty in getting the coupling off as he has only to unscrew it from the pipe 17 and then pull it apart.

What I claim as my invention is:—

1. A coupling comprising, complementary interiorly threaded sections provided with curved extending tongues, and having a plurality of unbroken angular outer faces, and receiving pockets, said tongues being threaded and overlapping a portion of the inner face of the adjacent section whereby an unbroken threaded interior surface and an outer hexagonal surface is obtained when the sections are assembled.

2. A coupling comprising, two sections of equal size having threaded semi-circular inner faces, and provided with threaded tongues extending from said threaded faces, the threads of the tongues and inner faces of one section registering with the corresponding threads of the opposing section when said sections abut, and receiving pockets arranged concentric to the common center of the coupling, the tongues of said sections extending beyond and overlapping the inner face of abutting edges of said sections when the sections are assembled, and the outer faces of said sections being of hexagonal formation.

Signed at Winnipeg this 18 day of March 1912.

RICHARD LANDGRIGE BEATTIE.

In the presence of—
G. L. BOXBAUGH,
R. FOSTER.